US012657314B2

(12) United States Patent
Dasari et al.

(10) Patent No.: US 12,657,314 B2
(45) Date of Patent: Jun. 16, 2026

(54) INFORMATION ERASE BY A DISCRETE SECURE ERASE HARDWARE LOGIC

(71) Applicant: HEWLETT PACKARD ENTERPRISE DEVELOPMENT LP, Spring, TX (US)

(72) Inventors: Shiva R. Dasari, Houston, TX (US); Dwight D. Riley, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 459 days.

(21) Appl. No.: 18/161,934

(22) Filed: Jan. 31, 2023

(65) Prior Publication Data

US 2024/0256679 A1 Aug. 1, 2024

(51) Int. Cl.
G06F 21/60 (2013.01)
G06F 21/79 (2013.01)

(52) U.S. Cl.
CPC ............ G06F 21/602 (2013.01); G06F 21/79 (2013.01)

(58) Field of Classification Search
CPC ........ G06F 21/602; G06F 21/79; G06F 21/72; G06F 2221/2143
See application file for complete search history.

(56) References Cited

U.S. PATENT DOCUMENTS 10,121,026 B1 * 11/2018 Ryland ................. H05K 7/1414
11,107,065 B1 * 8/2021 Gupta ............. G06K 19/07707

| | | | |
|---|---|---|---|
| 2012/0151121 A1 * | 6/2012 | Braga | G06F 21/79 |
| | | | 711/E12.008 |
| 2012/0161924 A1 * | 6/2012 | Lin | H04L 63/0853 |
| | | | 340/5.8 |
| 2012/0278579 A1 | 11/2012 | Goss et al. | |
| 2012/0311290 A1 * | 12/2012 | White | G06F 13/102 |
| | | | 711/170 |
| 2014/0022849 A1 | 1/2014 | Krutzik et al. | |
| 2016/0042176 A1 | 2/2016 | Riahi | |
| 2020/0358761 A1 * | 11/2020 | Ya | H04W 12/06 |
| 2021/0206100 A1 * | 7/2021 | Scofield | B33Y 40/00 |
| 2022/0138307 A1 * | 5/2022 | Ayyagari | G06F 21/44 |
| | | | 726/18 |

(Continued)

OTHER PUBLICATIONS

Tinfoilcipher, "Encrypting and Crypto-Shredding AWS S3 Objects Using KMS Keys", available online at <https://tinfoilcipher.co.uk/2021/09/20/encrypting-and-crypto-shredding-aws-s3-objects-using-kms-keys-part-1/>, Sep. 20, 2021, 13 pages.

(Continued)

*Primary Examiner* — Phy Anh T Vu
(74) *Attorney, Agent, or Firm* — Trop, Pruner & Hu, P.C.

(57) ABSTRACT

In some examples, a security chip for an electronic device includes a nonvolatile memory to store a collection of encryption keys for encrypting information to produce encrypted information. The security chip includes a discrete secure erase hardware logic and is separate from a collection of device processors of the electronic device. The discrete secure erase hardware logic receives an erase indication indicating a request to erase the encrypted information. In response to the erase indication, the discrete secure erase hardware logic erases the collection of encryption keys in the nonvolatile memory, and activates an output indication to cause activation of an erase indicator at the electronic device.

20 Claims, 5 Drawing Sheets

(56) References Cited

U.S. PATENT DOCUMENTS

| | | | |
|---|---|---|---|
| 2022/0191019 A1* | 6/2022 | Jaquette | ............... H04L 9/0861 |
| 2023/0403812 A1* | 12/2023 | Cheung | ............... H05K 7/1489 |

OTHER PUBLICATIONS

Wikipedia, "Crypto-shredding", available online at <https://en.wikipedia.org/w/index.php?title=Crypto-shredding&oldid=1039364950>, Aug. 18, 2021, 2 pages., Jun. 22, 2021.

* cited by examiner

300

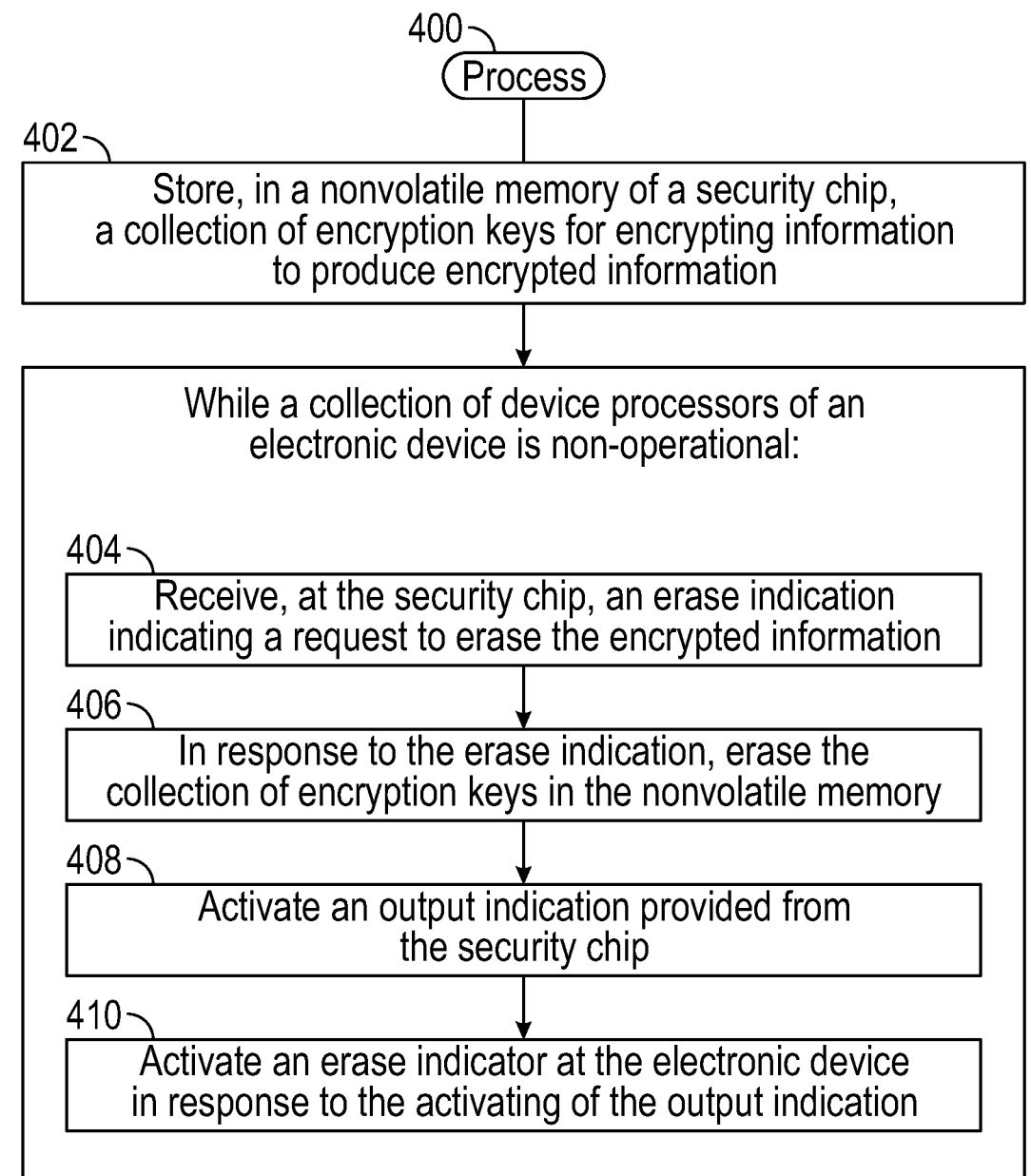

400

Process

402

Store, in a nonvolatile memory of a security chip,
a collection of encryption keys for encrypting information
to produce encrypted information While a collection of device processors of an
electronic device is non-operational:

404

Receive, at the security chip, an erase indication
indicating a request to erase the encrypted information

406

In response to the erase indication, erase the
collection of encryption keys in the nonvolatile memory

408

Activate an output indication provided from
the security chip

410

Activate an erase indicator at the electronic device
in response to the activating of the output indication

FIG. 4

INFORMATION ERASE BY A DISCRETE SECURE ERASE HARDWARE LOGIC

BACKGROUND

Infrastructure providers may provide infrastructure resources for use by tenants of the infrastructure providers. A "tenant" refers to a group of users, such as any enterprise (e.g., a business concern, a government agency, an educational organization, a charitable organization, an individual, etc.) that is able to use infrastructure resources owned or managed by another entity (referred to as an "infrastructure provider"). The use of the infrastructure resources by the tenant can be according to a relationship between the infrastructure provider and the tenant (e.g., based on an agreement, a lease, etc.).

BRIEF DESCRIPTION OF THE DRAWINGS

Some implementations of the present disclosure are described with respect to the following figures.

FIG. 4 is a flow diagram of a process according to some examples.

Figure 1:
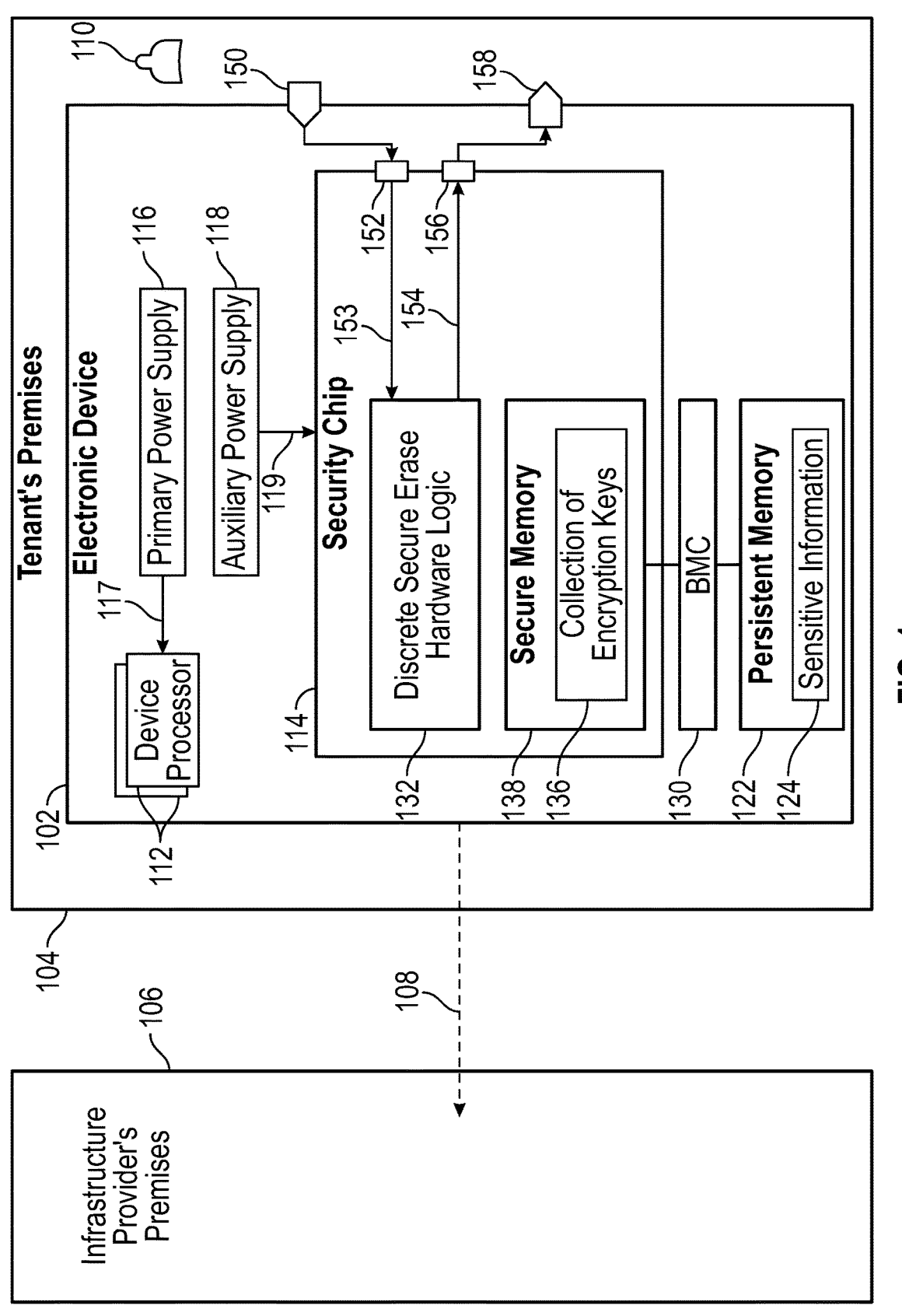
FIG. 1 is a block diagram of an arrangement including an electronic device provided at a tenant's premises, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An "infrastructure resource" can refer to any type of electronic device, such as a computer, a storage device, a communication node (such as a switch or router), a vehicle, industrial equipment, and so forth, that is able to perform compute, storage, and/or communication operations. In some cases, the electronic devices can be provided by the infrastructure provider to a tenant for use at the tenant's premises. In other cases, the electronic devices can be physically provided at the infrastructure provider's premises, where the electronic devices can be used by tenants as part of cloud services provided by the infrastructure provider.

As a result of use of an electronic device by a tenant, sensitive information may be stored on the electronic device. In some examples, the electronic device includes a persistent memory to store information in a secure manner. For example, the information can be stored as encrypted information in the persistent memory. The encrypted information is produced by encrypting the information using an encryption key (or more generally, a collection of encryption keys, where a collection of encryption keys can include a single encryption key or multiple encryption keys).

In examples where an electronic device of an infrastructure provider is used at a tenant's premises, the electronic device can be returned from the tenant to an infrastructure provider for any of various reasons, such as at the end of a term associated with use of the electronic device, return of the electronic device for servicing or maintenance, or for any other reason. Before returning the electronic device to the infrastructure provider, the tenant may erase sensitive information stored in the electronic device, to avoid unauthorized access of the sensitive information once the electronic device is returned to the infrastructure provider. The erasing of the sensitive information is to maintain provider-tenant isolation, in which the infrastructure provider is prevented from accessing the tenant's data on the electronic device.

In other examples where an electronic device is operated at the infrastructure provider's premises, once a tenant is done with use of the electronic device, the infrastructure provider may be responsible for erasing the tenant's data on the electronic device.

In some cases, the erasing of sensitive information is accomplished by issuing erase commands. Users may not be provided with reliable indications that erase operations were successfully performed in response to erase commands. In further examples, erase mechanisms may install designated machine-readable instructions (e.g., device embedded firmware or other types of machine-readable instructions) on the electronic device to place the electronic device into a specific state before information can be erased in the electronic device. However, in such further examples, the designated machine-readable instructions may be corrupted, which can either prevent the secure erasing of sensitive information or may allow unauthorized access of the sensitive information in the electronic device.

In other examples, erase mechanisms may employ a hardware device to store a collection of encryption keys used to encrypt information stored in an electronic device. To effectively erase the encrypted information, a user can physically destroy the hardware device, which renders the collection of encryption keys stored on the hardware device inaccessible. However, having to physically destroy the hardware device means that the hardware device is no longer reusable, which can increase operational costs.

In accordance with some implementations of the present disclosure, erase mechanisms are provided to securely erase encrypted information by erasing, using a discrete secure erase hardware logic of a security chip, a collection of encryption keys (a single encryption key or multiple encryption keys) stored in the security chip of an electronic device. Erasing the collection of encryption keys means that the collection of encryption keys would no longer be available to decrypt the encrypted information, which renders the encrypted information inaccessible and thus effectively erased. The secure erasing of encrypted information is initiated with an actuator that that is operated by a user that is in close physical proximity to the electronic device. In this way, remote erasing of the encrypted information is prevented, so that an attacker would not be able to damage the electronic device from a remote location, such as over a network (wired or wireless network). Moreover, the secure erasing of the encrypted information is performed by the discrete secure erase hardware logic without involvement of a device processor (e.g., a main processor) of the electronic device, where the device processor is separate from the discrete secure erase hardware logic. In fact, the device processor can remain non-operational (e.g., powered off or otherwise disabled) while the discrete secure erase hardware logic erases a collection of encryption keys. The discrete secure erase hardware logic can be powered by an auxiliary power supply while a main power supply for the device processor remains powered off. Keeping the device processor non-operational while the discrete secure erase hardware logic erases the collection of encryption keys prevents malware or compromised machine-readable instructions executing on the electronic device from interfering with the erase operation.

In addition, erase mechanisms according to some examples of the present disclosure allow the discrete secure erase hardware logic to output a signal that can activate a local indicator (e.g., a visual indicator, an audio indicator, a tactile indicator such as a vibrational element, etc.) at the electronic device to provide an express confirmation that the erase operation was successfully completed.

As used here, the discrete secure erase hardware logic is implemented using a combination of hardware logic gates, such as AND gates, OR gates, NAND gates, and so forth. For example, the discrete secure erase hardware logic can be implemented as a state machine. The discrete secure erase hardware logic is "discrete" in the sense that operations of the discrete secure erase hardware logic are independent of and separate from operations of other components of an electronic device. For example, machine-readable instructions (e.g., firmware and/or software) of the electronic device, whether executed by main processor(s) or other controller(s) of the electronic device, are not used to implement the discrete secure erase hardware logic, such that the discrete secure erase hardware logic is implemented with just hardware. In this manner, compromised machine-readable instructions of the electronic device cannot interfere with a secure erase operation performed by the discrete secure erase hardware logic.

FIG. 1 is a block diagram of an example arrangement that includes an electronic device 102 provided at a tenant's premises 104. The electronic device 102 is provided (e.g., owned, managed by, etc.) by an infrastructure provider. In examples according to FIG. 1, the electronic device 102 is provided by the infrastructure provider to the tenant, for use at the tenant's premises 104. Note that multiple electronic devices 102 may be provided by the infrastructure provider to the tenant for use at the tenant's premises 104. In further examples, electronic devices 102 used at the tenant's premises 104 may be provided by multiple different infrastructure providers.

As used here, "premises" refers to a physical location associated with an entity, such as a tenant or an infrastructure provider. For example, the tenant's premises 104 can refer to an office, a data center, a home, or any other location. An infrastructure provider's premises 106 can refer to a location at which infrastructure resources are provided for cloud services accessible by tenants. The term "location" can refer to a single location or multiple locations.

Although FIG. 1 shows an example in which the electronic device is operated at the tenant's premises 104, in other examples, the electronic device 102 can be operated at the infrastructure provider's premises 106. In such alternative examples, a user of the tenant is able to remotely access the electronic device 102, such as over a network, for use by the user.

The electronic device 102 at some point may be returned (at 108) to the infrastructure provider. This may occur at the end of a term of use of the electronic device 102 by the tenant, or to perform servicing or maintenance by the infrastructure provider, or for any other reason. Prior to returning the electronic device 102 to the infrastructure provider, a user 110 of the tenant may initiate a secure erase operation controlled by a discrete secure erase hardware logic according to some examples of the present disclosure to erase sensitive information from the electronic device 102.

In other examples where the electronic device 102 is operated at the infrastructure provider's premises 106 for remote use by a tenant, then upon the tenant ending use of the electronic device 102, a user at the infrastructure provider's premises 106 would trigger the secure erase operation controlled by a discrete secure erase hardware logic according to some examples of the present disclosure of the electronic device 102.

The electronic device 102 includes a collection of device processors 112 and a security chip 114. As used here, a "collection" of items can refer to a single item or multiple items. Thus, a collection of device processors 112 includes a single device processor or multiple device processors. A processor can include a microprocessor, a core of a multi-core microprocessor, a microcontroller, a programmable integrated circuit, a programmable gate array, or another hardware processing circuit.

The collection of device processors 112 makes up the main processor(s) of the electronic device 102. The collection of device processors 112 executes an operating system (OS) of the electronic device 102, firmware (e.g., Basic Input/Output System or BIOS code), application programs, and other programs of the electronic device 102.

The security chip 114 is separate (e.g., physically separate) from the collection of device processors 112. A "security chip" can refer to an electronic component such as in the form of a circuit board, an integrated circuit device, and so forth. The security chip 114 can perform operations while the collection of device processors 112 is non-operational. A device processor being non-operational can refer to either the device processor being powered off or being maintained in a reset state or otherwise disabled, such that the device processor is unable to execute any machine-readable instructions or perform any operations.

In examples according to FIG. 1, a primary power supply 116 in the electronic device 102 provides a primary power voltage 117 to the collection of device processors 112. Additionally, the electronic device 102 includes an auxiliary power supply 118 (e.g., a battery) that provides an auxiliary power voltage 119 to the security chip 114. The auxiliary power voltage 119 can be active while the primary power voltage 117 is off. In other examples, both the primary power voltage 117 and the auxiliary power voltage 119 can be provided by the same power supply, which can independently control the on/off states of the primary power voltage 117 and the auxiliary power voltage 119.

The electronic device 102 includes a persistent memory 122 that can be used to store sensitive information 124. The persistent memory 122 can be implemented using a collection of persistent memory devices, such as flash memory devices, disk-based storage devices, and so forth. The electronic device 102 also includes a baseboard management controller (BMC) 130 that can perform various management tasks for the electronic device 102. A BMC is discussed further below. In some examples, the persistent memory 122 may be part of the BMC 130 or may be outside of the BMC 130.

Examples of the sensitive information 124 that can be stored in the persistent memory 122 include any or some combination of the following: a configuration setting of the BMC 130 that controls a configuration of the BMC 130, a credential (e.g., a password or any other type of credential) that allows for access of the BMC 130 or a portion of the BMC 130, a database of secure boot keys to perform secure booting of the BMC 130, user account information for the BMC 130, license information relating to the BMC 130, information stored in a security processor such as a trusted platform module (TPM), security certificates, recovery information, such as recovery code images for firmware of the BMC 130, certain data, or any other information.

Although specific examples of sensitive information are listed, it is noted that in other examples, additional or alternative sensitive information can be stored in the persistent memory 122, including sensitive information not related to the BMC 130. Also, a portion of the sensitive information 124 can be stored on a further storage medium (e.g., a collection of disk-based storage devices such as hard disk drives or a collection of solid state drives) of the electronic device 102.

In accordance with some implementations of the present disclosure, the security chip 114 includes a discrete secure erase hardware logic 132 that when activated performs a cryptographic erase of the sensitive information 124. Erasing the sensitive information 124 can refer to making the sensitive information 124 no longer accessible.

In some examples, the sensitive information 124 stored in the persistent memory 122 (and possibly also on a further storage medium) was encrypted by the BMC 130 using a collection of encryption keys 136. The collection of encryption keys 136 is stored in a secure memory 138 of the security chip 114.

Cryptographically erasing the encrypted sensitive information 124 can be accomplished by the discrete secure erase hardware logic 134 by erasing the collection of encryption keys 136 stored in the secure memory 138. The collection of encryption keys 136 can be erased by overwriting the collection of encryption keys 136 with a specified pattern or otherwise removing the collection of encryption keys 136 from the secure memory 138 such that the collection of encryption keys 136 can no longer be recovered. In an example, the discrete secure erase hardware logic 134 can erase a primary key that is part of the collection of encryption keys 136. To encrypt information, the BMC 130 can derive one or more further keys from the primary key, and the one or more further keys can be used to encrypt the information. To decrypt encrypted information, one or more decryption keys can be derived from the primary key to use in decrypting the encrypted information. If the primary key is erased, then the BMC 130 would be unable to derive the decryption key(s) and thus the encrypted information would be cryptographically erased.

The secure memory 138 can be implemented using a collection of memory devices. The memory devices can be nonvolatile memory devices such as flash memory devices or other types of nonvolatile memory devices.

In accordance with some implementations of the present disclosure, the electronic device 102 includes a secure erase actuator 150, which can be activated by the user 110 that is in close proximity of the electronic device 102. In some examples, user 110 is in "close proximity" to an electronic device 102 if the electronic device 102 is within reach or line of sight of the user 110.

In some examples, the secure erase actuator 150 on the electronic device 102 is a physically activatable component, such as a push button, a physical switch, a touchscreen, a touchpad, a user input device such as a keyboard or mouse device, a hardware port to receive an input device, or any other physical element that can be physically manipulated by the user 110. As an example, a touchscreen of the electronic device 102 can present a local user interface (UI)

at the electronic device 102, and the local UI can include a UI element activatable by user touch to initiate a secure erase operation to securely erase the sensitive information 124. As another example, the secure erase actuator 150 includes a hardware port into which the user 110 can insert a peripheral device that includes functionality that is activated in response to insertion of the peripheral device into the hardware port.

In yet further examples, the secure erase actuator 150 includes a biometric reader that can sense a biometric feature of the user 110, such as the user's fingerprint, the user's face, the user's eyes, and so forth. The discrete secure erase hardware logic 132 can authorize a secure erase operation if the biometric reader senses a biometric feature that matches a stored biometric feature. In other examples, the secure erase actuator 150 includes a credential input device to receive a credential from the user 110, such as a password, a security card, and so forth. The discrete secure erase hardware logic 132 can authorize a secure erase operation if a valid credential is received.

More generally, the secure erase actuator 150 is a proximity-based actuator for initiating a secure erase operation based on user proximity to the electronic device 102. If a user is not in close proximity to the electronic device 102, then the secure erase operation cannot be initiated by the discrete secure erase hardware logic 132. This ensure that a user requesting the secure erase operation is physically close to the electronic device 102, in contrast to a user who is remotely located such as a hacker who is attempting to initiate a secure erase operation from a remote location.

In some examples, close proximity of the user 110 to the electronic device 102 may further be indicated based on the user 110 being able to physically access the electronic device 102 after unlocking a physical containment structure in which the electronic device 102 is contained. For example, the physical containment structure can include a locked rack that holds multiple electronic devices. To physically access any of the electronic devices, the user 110 would have to be able to first unlock the rack.

The secure erase actuator 150 is coupled to an erase activation input 152 of the security chip 114. In some examples, the erase activation input 152 includes an input pin of the security chip 114, which can be connected over an electrical link to the secure erase actuator 150. In other examples, the erase activation input 152 can be a physical port of the security chip 114, in which a peripheral device can be inserted by the user 110 to initiate a secure erase operation. In examples where the erase activation input 152 is a physical port of the security chip 114, the secure erase actuator 150 of the electronic device 102 can be a receptable through which the peripheral device can be inserted to plug into the physical port of the security chip 114.

The discrete secure erase hardware logic 132 is coupled to the erase activation input 152, such as over an electrical conductor or through intervening electronic component(s). In response to activation of the erase activation input 152, such as due to activation of the secure erase actuator 150 by the user 110, the discrete secure erase hardware logic 132 receives an erase activation signal 153 that is asserted to cause the discrete secure erase hardware logic 132 to initiate a secure erase operation. As used here, "asserting" a signal refers to transitioning the signal from an inactive state (e.g., low or high state) to an active state (e.g., high or low state).

In response to the activation of the erase activation input 152, the discrete secure erase hardware logic 132 erases the collection of encryption keys 136 in the secure memory 138. In some examples, the discrete secure erase hardware logic 132 is able to erase the collection of encryption keys 136 without fully powering on the electronic device 102 and without any involvement or access by the collection of device processors 112. For example, the primary power supply 116 can be off so that the collection of device processors 112 is non-operational, and thus the majority of the functionalities of the electronic device 102 is disabled. The auxiliary power supply 118 is on while the primary power supply 116 is off, to allow the discrete secure erase hardware logic 132 to perform the secure erase operation. Also, since the collection of device processors 112 is non-operational, the collection of device processors 112 is unable to interfere with the secure erase operation, so that any malware that may have infected the electronic device 102 would not be able to stop the secure erase operation.

The discrete secure erase hardware logic 132 is able to erase the collection of encryption keys 136 in the secure memory 138 without physically damaging any hardware component. As a result, after the collection of encryption keys 136 has been erased, the secure memory 138 can be reused to store another collection of encryption keys 136 for use in encrypting further information.

Upon successful erasing of the collection of encryption keys 136 by the discrete secure erase hardware logic 132, the discrete secure erase hardware logic 132 asserts an erase complete signal 154, which is provided over an electrical conductor or through intervening electronic component(s) to an erase indicator output 156 of the security chip 114. For example, the erase indicator output 156 includes an output pin of the security chip 114.

The erase indicator output 156 of the security chip 114 is coupled (e.g., over an electrical wire) to an erase indicator 158, which can be provided on the electronic device 102, such as on the housing of the electronic device 102. In some examples, the erase indicator 158 can include any or some combination of the following: a visual indicator (e.g., including a collection of light emitting diodes (LEDs)), an audio indicator (e.g., a speaker), a tactile indicator (e.g., a vibrating element), and so forth. The erase indicator 158 when activated is visible to the user 110 when in close proximity to the electronic device 102, and provides an indication of successful completion of the secure erase operation initiated by the user 110.

In other examples, the erase indicator output 156 can include a physical indicator (e.g., any or some combination of a visual indicator, an audio indicator, a tactile indicator, etc.) on the security chip 114. In such examples, the erase indicator 158 of the electronic device 102 can be an opening or other element through which the erase indicator output 156 of the security chip 114 is communicated to the user 110 when in close proximity.

Figure 2:
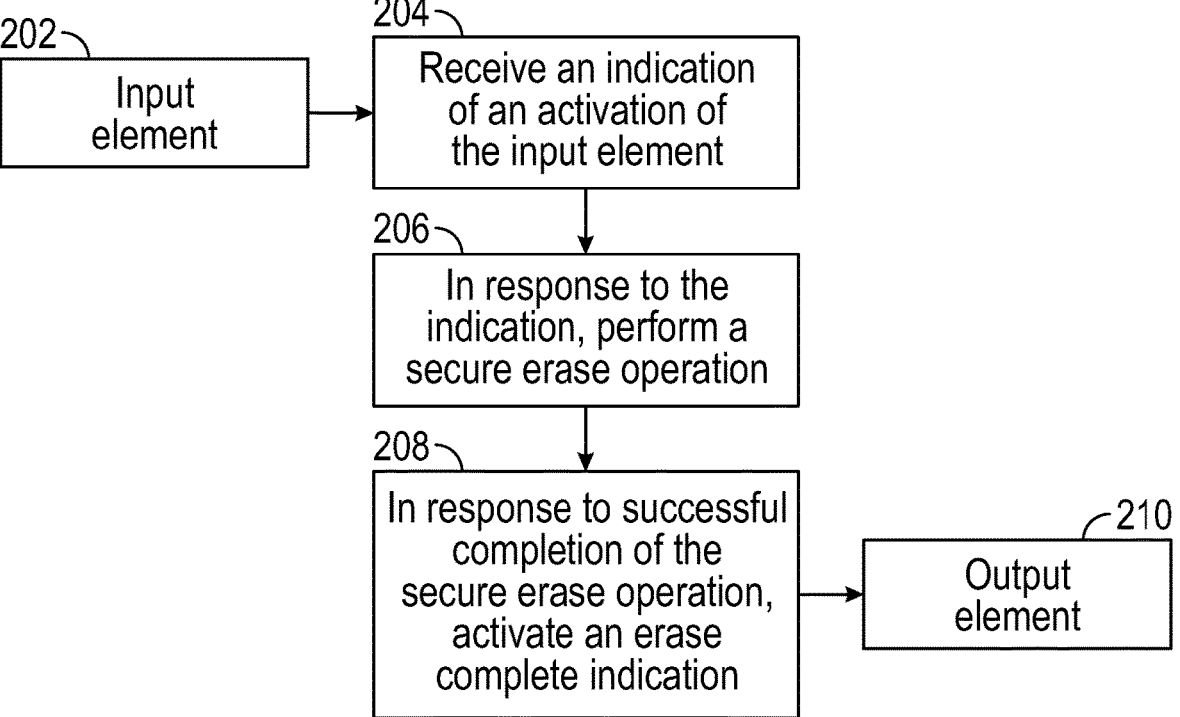
FIG. 2 is a flow diagram of a secure erase process according to some examples.

FIG. 2 is a flow diagram of a process performed by a security chip, such as by the discrete secure erase hardware logic 132 in the security chip 114 of FIG. 1, that is separate from main processor(s) of an electronic device, such as the collection of device processors 112 shown in FIG. 1.

The discrete secure erase hardware logic 132 receives (at 204) an indication of an activation of an input element 202 (activated by a user) to trigger a secure erase operation. In some examples, the input element 202 can be the secure erase actuator 150 on the electronic device, and/or the erase activation input 152 of the security chip 114 of FIG. 1.

In response to the indication of the activation of the input element 202, the discrete secure erase hardware logic 132 performs (at 206) a secure erase operation. The secure erase operation includes erasing a collection of encryption keys, such as the collection of encryption keys 136 stored in the secure memory 138 of FIG. 1, which cryptographically erases sensitive information (e.g., 124) that has been encrypted using the collection of encryption keys 136.

In response to successful completion of the secure erase operation, the discrete secure erase hardware logic 132 activates (at 208) an erase complete indication (e.g., the erase complete signal 154 of FIG. 1). The activation of the erase complete indication causes activation of an output element 210 to notify the user that the secure erase operation was completed. In some examples, the output element 210 can be the erase indicator output 156 of the security chip 114 and/or the erase indicator 158 of the electronic device 102 of FIG. 1.

Figure 3:
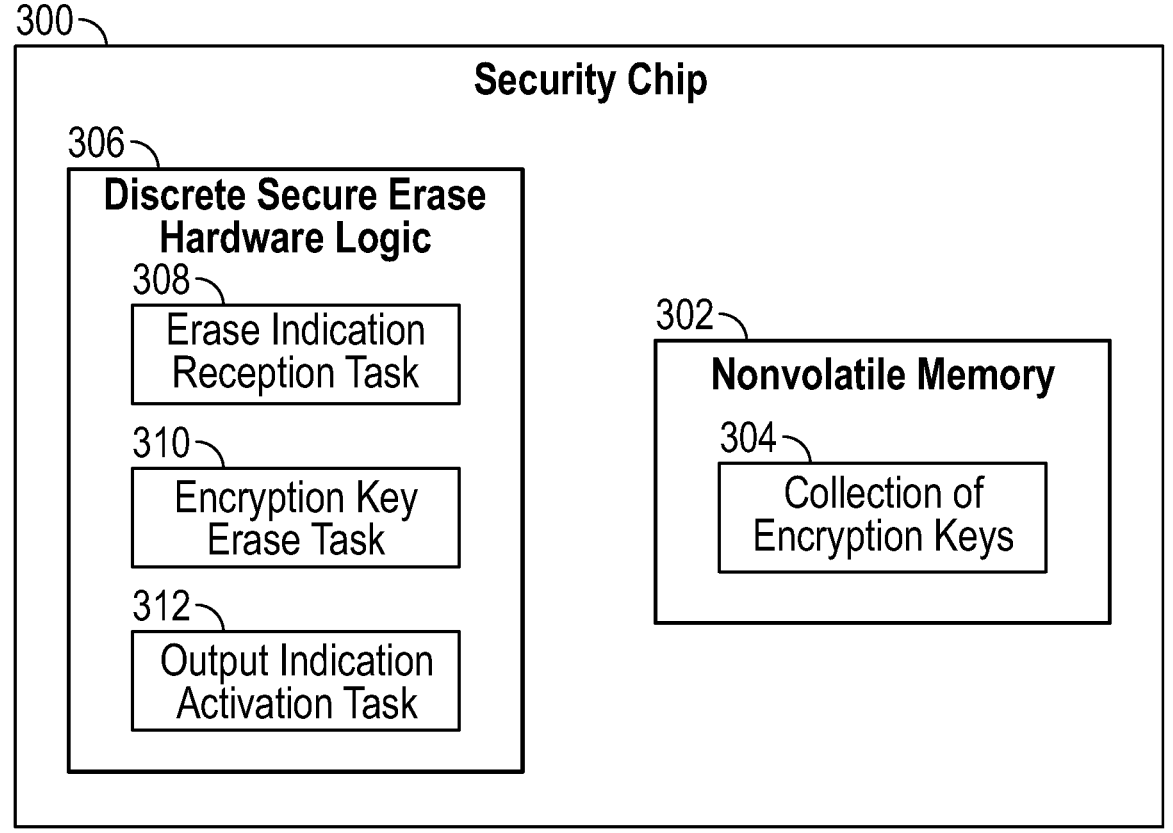
FIG. 3 is a block diagram of a security chip including a discrete secure erase hardware logic according to some examples.

FIG. 3 is a block diagram of a security chip 300 for an electronic device (e.g., 102 in FIG. 1). In some examples, the security chip 300 can be the security chip 114 of FIG. 1. The security chip 300 can be physically separate from other components of an electronic device. For example, the security chip 300 can be physically separate from the collection of device processors 112 and from the BMC 130 of FIG. 1. In other examples, the security chip 300 and the BMC 130 can be physically housed together in a package, but the security chip 300 and the BMC 130 are logically separate in that they perform independent tasks (i.e., the tasks of the security chip 300 are not controlled by the BMC 130).

The security chip 300 includes a nonvolatile memory 302 to store a collection of encryption keys 304 for encrypting information to produce encrypted information. The nonvolatile memory 302 may be the secure memory 138 that is in the security chip 114 of FIG. 1, for example.

The security chip 300 includes a discrete secure erase hardware logic 306 and is separate from a collection of device processors of the electronic device. The discrete secure erase hardware logic 306 is to perform various tasks. The tasks of the discrete secure erase hardware logic 306 include an erase indication reception task 308 to receive, at the discrete secure erase hardware logic 306, an erase indication indicating a request to erase the encrypted information. The erase indication can be the asserted erase activation signal 153 of FIG. 1, for example. In some examples, the erase indication is provided based on user interaction with an erase actuator at the electronic device while the user is in close proximity to the electronic device.

The tasks of the discrete secure erase hardware logic 306 include an encryption key erase task 310 to, in response to the erase indication, erase the collection of encryption keys in the nonvolatile memory. The tasks of the discrete secure erase hardware logic 306 further include an output indication activation task 312 to activate an output indication to cause activation of an erase indicator at the electronic device. For example, the erase indicator can be the erase indicator 158 on the electronic device 102 and/or the erase indicator output 156 of the security chip 114 of FIG. 1.

In some examples, the discrete secure erase hardware logic 306 is to receive the erase indication, erase the collection of encryption keys, and activate the output indication while the collection of device processors in the electronic device is non-operational (e.g., powered off).

In some examples, the security chip 300 is powered by an auxiliary power voltage while a power voltage for the collection of device processors is off.

In some examples, the discrete secure erase hardware logic 306 is to receive the erase indication, erase the collection of encryption keys, and activate the output indication without execution of any machine-readable instructions on the security chip 300. The discrete secure erase hardware logic 132 is implemented in hardware without use of any machine-readable instructions.

In some examples, the discrete secure erase hardware logic 306 is enabled to perform the erasing of the collection of encryption keys based on an indication of a physical presence of a user. The indication of the physical presence of the user can be based on the fact that the user has access to the electronic device (such as after the user has unlocked a locked containment structure), or based on the user physically manipulating an input element at the electronic device (e.g., actuating a push button, touching a UI, inserting a peripheral device, etc.

FIG. 4 is a flow diagram of a process 400 according to some examples. The process 400 includes storing (at 402), in a nonvolatile memory of a security chip, a collection of encryption keys for encrypting information to produce encrypted information. In some examples, the collection of encryption keys can include a primary key from which encryption/decryption keys are derived.

The process 400 includes performing additional tasks while a collection of device processors of an electronic device is non-operational. The tasks include receiving (at 404), at a discrete secure erase hardware logic, an erase indication indicating a request to erase the encrypted information. The erase indication is activated based on user proximity to the electronic device.

The tasks further include, in response to the erase indication, erasing (at 406) the collection of encryption keys in the nonvolatile memory. By erasing the collection of encryption keys, the encrypted information encrypted using the collection of encryption keys is rendered inaccessible.

The tasks further include activating (at 408) an output indication provided from the security chip. The output indication can be an output pin of the security chip, for example.

The tasks further include activating (at 410) an erase indicator at the electronic device in response to the activating of the output indication. The erase indicator can be on a housing of the electronic device, for example.

In some examples, the erasing of the collection of encryption keys is performed prior to returning the electronic device from a tenant to a provider of the electronic device. In further examples, the erasing of the collection of encryption keys is performed by a infrastructure provider of the electronic device.

Figure 5:
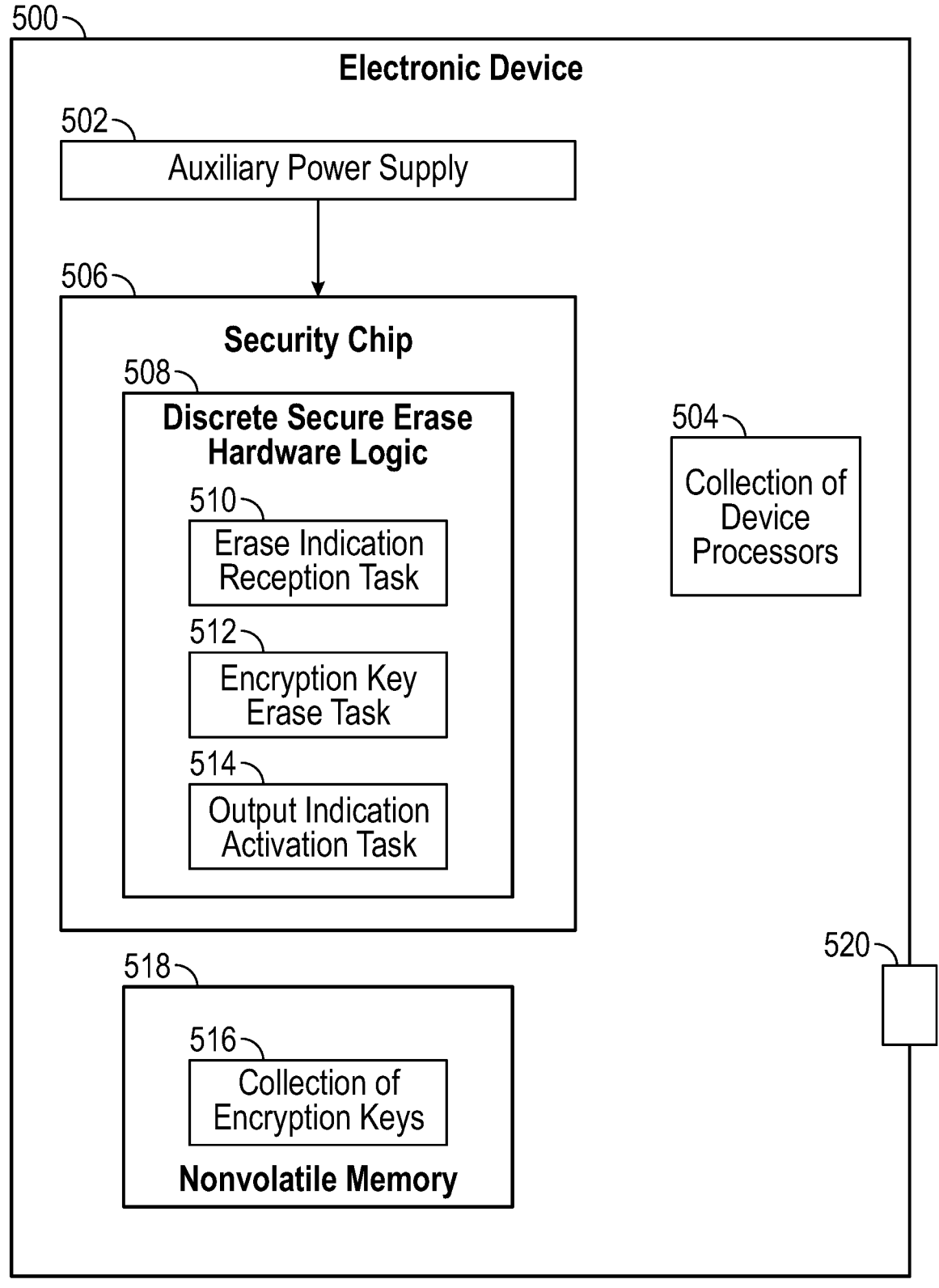
FIG. 5 is a block diagram of an electronic device according to some examples.

FIG. 5 is a block diagram of an electronic device 500 according to some examples. The electronic device 500 includes an auxiliary power supply 502 that provides an auxiliary power voltage, which can be turned on while a primary power voltage, such as from a primary power supply, is turned off.

The electronic device 500 includes a collection of device processors 504. The collection of device processors 504 executes certain machine-readable instructions such as an OS, firmware, application programs, etc., of the electronic device 500.

The electronic device 500 includes a security chip 506 that is separate from the collection of device processors 504. The security chip 506 is powered by the auxiliary power supply 502 while the collection of device processors 504 is non-operational. The security chip 506 includes a discrete secure erase hardware logic 508 to perform tasks relating to a secure erasing of sensitive information. The discrete secure erase hardware logic 508 is implemented with just hardware and does not rely on any machine-readable instructions to operate.

The tasks of the discrete secure erase hardware logic 508 include an erase indication reception task 510, an encryption key erasing task 512, and an output indication activation task 514. The erase indication reception task 510 receives an erase indication activated by a user and indicating a request to erase encrypted information in a persistent memory. The encrypted information is part of the sensitive information and is encrypted using a collection of encryption keys 516 in a nonvolatile memory 518 of the electronic device 500.

The encryption key erasing task 512 erases the collection of encryption keys in the nonvolatile memory in response to the erase indication. The output indication activation task 514 activates an output indication provided from the management controller to cause activation of an erase indicator 520 at the electronic device 500. The erase indicator 520 can include any or some combination of a visual indicator, an audio indicator, or a tactile indicator.

A "BMC" (e.g., the BMC 130 of FIG. 1) can refer to a specialized service controller that monitors the physical state of an electronic device using sensors and communicates with a remote management system (that is remote from the electronic device) through an independent "out-of-band" connection. The BMC can perform management tasks to manage components of the electronic device. Examples of management tasks that can be performed by the BMC can include any or some combination of the following: power control to perform power management of the electronic device (such as to transition the electronic device between different power consumption states in response to detected events), thermal monitoring and control of the electronic device (such as to monitor temperatures of the electronic device and to control thermal management states of the electronic device), fan control of fans in the electronic device, system health monitoring based on monitoring measurement data from various sensors of the electronic device, remote access of the electronic device (to access the electronic device over a network, for example), remote reboot of the electronic device (to trigger the electronic device to reboot using a remote command), system setup and deployment of the electronic device, system security to implement security procedures in the electronic device, and so forth.

In some examples, the BMC can provide so-called "lights-out" functionality for an electronic device. The lights out functionality may allow a user, such as a systems administrator, to perform management operations on the electronic device even if an OS is not installed or not functional on the electronic device.

Moreover, in some examples, the BMC can run on auxiliary power provided by an auxiliary power supply (e.g., 118 in FIG. 1; as a result, the electronic device does not have to be powered on to allow the BMC to perform the BMC's operations. The auxiliary power supply is separate from a primary power supply that supplies powers to other components (e.g., a main processor, a memory, an input/output (I/O) device, etc.) of the electronic device.

In some examples, in addition to the BMC in each electronic device, an additional management controller (separate from the BMCs) can be used to interact with the BMCs to perform management of the electronic devices. In examples where the electronic devices are server computers (or other types of electronic devices) mounted in a rack, the additional management controller can be referred to as a rack management controller (RMC). A "rack" refers to a mounting structure that has supports for multiple electronic devices.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
a collection of device processors;
a physical erase actuator;
an erase indicator; and
a security chip comprising:
    a nonvolatile memory to store a collection of encryption keys for encrypting information to produce encrypted information; and
    a discrete secure erase hardware logic in the security chip and that is separate from the collection of device processors, the discrete secure erase hardware logic to, while the collection of device processors is disabled:
        enable the discrete secure erase hardware logic to perform an erase of the collection of encryption keys based on an indication of a physical containment structure of the electronic device being unlocked;
        receive, at the discrete secure erase hardware logic, an erase indication indicating a request to erase the encrypted information, the erase indication provided based on physical user interaction with the physical erase actuator,
        in response to the erase indication and the discrete secure erase hardware logic being enabled based on the indication of the physical containment structure being unlocked, erase the collection of encryption keys in the nonvolatile memory, and
        activate an output indication to cause activation of the erase indicator of the electronic device.

2. The electronic device of claim 1, wherein the physical erase actuator comprises a biometric reader to sense a biometric feature of a user, and the discrete secure erase hardware logic is to authorize the erasing of the collection of encryption keys based on the biometric feature sensed by the biometric reader.

3. The electronic device of claim 1, wherein the physical erase actuator comprises a receptacle to receive a peripheral device to plug into a physical port of the security chip, and wherein the erase indication is based on the peripheral device being plugged into the physical port of the security chip.

4. The electronic device of claim 1, further comprising:
one or more power supplies to:
    inactivate a primary power voltage to the collection of device processors to disable the collection of device processors, and
    activate an auxiliary power voltage to the security chip while the primary power voltage to the collection of device processors is inactivated.

5. The electronic device of claim 1, wherein the discrete secure erase hardware logic is to receive the erase indication, erase the collection of encryption keys, and activate the output indication without execution of any machine-readable instructions on the security chip.

6. The electronic device of claim 1, wherein the erasing of the collection of encryption keys renders the encrypted information in a persistent memory of the electronic device inaccessible.

7. The electronic device of claim 1, comprising:
an output pin to communicate the output indication to the erase indicator of the electronic device.

8. The electronic device of claim 1, wherein the erase indicator is selected from among a visual indicator, an audio indicator, or a tactile indicator.

9. The electronic device of claim 1, wherein the physical containment structure holds a plurality of electronic devices.

10. A method comprising:
storing, in a nonvolatile memory of a security chip in an electronic device, a collection of encryption keys for encrypting information to produce encrypted information;
while a collection of device processors in the electronic device is disabled:
    enabling, by the security chip, a discrete secure erase hardware logic in the security chip to perform an erase of the collection of encryption keys based on an indication of a physical containment structure of the electronic device being unlocked;
    receiving, at the security chip, an erase indication indicating a request to erase the encrypted information, the erase indication provided based on physical user interaction with a physical erase actuator of the electronic device;
    as a response to the erase indication and when the discrete secure erase hardware logic is enabled based on the indication of the physical containment structure being unlocked, erasing, by the discrete secure erase hardware logic in the security chip, the collection of encryption keys in the nonvolatile memory;
    activating an output indication provided from the security chip; and
    activating an erase indicator at the electronic device in response to the activating of the output indication.

11. The method of claim 10, wherein the erasing of the collection of encryption keys is performed prior to returning the electronic device from a tenant to a provider of the electronic device.

12. The method of claim 10, wherein the physical containment structure holds a plurality of electronic devices.

13. The method of claim 10, wherein the physical erase actuator comprises a biometric reader to sense a biometric feature of a user, and the method comprises:
authorizing, by the discrete secure erase hardware logic, the erasing of the collection of encryption keys based on the biometric feature sensed by the biometric reader.

14. The method of claim 10, wherein the erasing of the collection of encryption keys in the nonvolatile memory is performed while an auxiliary power voltage to the security chip is activated and a primary power supply to the collection of device processors is off.

15. The method of claim 10, wherein the physical erase actuator comprises a receptacle to receive a peripheral device to plug into a physical port of the security chip, and wherein the erase indication is based on the peripheral device being plugged into the physical port of the security chip.

16. An electronic device comprising:
a physical erase actuator;
an erase indicator;

an auxiliary power supply;

a collection of device processors; and a security chip separate from the collection of device processors and powered by the auxiliary power supply while a primary power voltage to the collection of device processors is off, the security chip comprising a discrete secure erase hardware logic to, while the collection of device processors is disabled by the primary power voltage being off:

enable the discrete secure erase hardware logic to perform an erase of the collection of encryption keys based on an indication of a physical containment structure of the electronic device being unlocked;

receive an erase indication activated by a user and indicating a request to erase encrypted information in a persistent memory, the encrypted information encrypted using a collection of encryption keys in a nonvolatile memory of the security chip, the erase indication provided based on physical user interaction with the physical erase actuator, in response to the erase indication and the discrete secure erase hardware logic being enabled based on the indication of the physical containment structure being unlocked, erase the collection of encryption keys in the nonvolatile memory, and activate an output indication provided from the security chip to cause activation of the erase indicator of the electronic device.

17. The electronic device of claim 16, wherein the erase indicator is selected from among a visual indicator, an audio indicator, or a tactile indicator that can be sensed by the user when in a proximity of the electronic device.

18. The electronic device of claim 16, wherein the erasing of the collection of encryption keys results in erasing of the encrypted information belonging to a tenant of an infrastructure provider that provides the electronic device.

19. The electronic device of claim 16, wherein the physical erase actuator comprises a biometric reader to sense a biometric feature of a user, and the discrete secure erase hardware logic is to authorize the erasing of the collection of encryption keys based on the biometric feature sensed by the biometric reader.

20. The electronic device of claim 16, wherein the physical erase actuator comprises a receptacle to receive a peripheral device to plug into a physical port of the security chip, and wherein the erase indication is based on the peripheral device being plugged into the physical port of the security chip.

* * * * *